(12) United States Patent
Suzuki et al.

(10) Patent No.: US 7,691,957 B2
(45) Date of Patent: Apr. 6, 2010

(54) BUTADIENE-BASED POLYMER AND METHOD OF PRODUCING THE SAME AS WELL AS RUBBER COMPOSITION AND TIRE USING THE SAME

(75) Inventors: Eiju Suzuki, Kodaira (JP); Yoichi Ozawa, Kodaira (JP); Tetsuya Ohmura, Kodaira (JP); Junko Kurazumi, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 10/562,157

(22) PCT Filed: Jun. 23, 2004

(86) PCT No.: PCT/JP2004/008804

§ 371 (c)(1),
(2), (4) Date: Dec. 23, 2005

(87) PCT Pub. No.: WO2005/000921

PCT Pub. Date: Jan. 6, 2005

(65) Prior Publication Data

US 2007/0055029 A1    Mar. 8, 2007

(30) Foreign Application Priority Data

Jun. 25, 2003    (JP)    ............... 2003-181042

(51) Int. Cl.
*C08F 136/06* (2006.01)
*C08F 4/52* (2006.01)
*C08F 2/02* (2006.01)
*B60C 1/00* (2006.01)

(52) U.S. Cl. ............... 526/340.4; 526/133; 526/153; 526/164; 526/902; 524/571; 152/450; 152/905

(58) Field of Classification Search ............... 526/164, 526/340.4, 133, 153, 902; 524/571; 152/450, 152/905
See application file for complete search history.

(56) References Cited

U.S. PATENT DOCUMENTS

| | | | | |
|---|---|---|---|---|
| 4,429,089 A * | 1/1984 | Pedretti et al. | ............... | 526/153 |
| 5,858,903 A * | 1/1999 | Sylvester et al. | ............... | 502/118 |
| 6,046,266 A * | 4/2000 | Sandstrom et al. | ............... | 524/492 |
| 6,136,931 A * | 10/2000 | Jang et al. | ............... | 526/133 |
| 6,451,934 B1 * | 9/2002 | Jang et al. | ............... | 526/117 |
| 2002/0119889 A1 * | 8/2002 | Kaita et al. | ............... | 502/171 |

FOREIGN PATENT DOCUMENTS

| | | |
|---|---|---|
| CN | 1296982 A | 5/2001 |
| CN | 1649919 A | 8/2005 |
| JP | 55-66903 A | 5/1980 |
| JP | 7-165811 A | 6/1995 |
| JP | 7-188316 A | 7/1995 |
| JP | 2000-34320 A | 2/2000 |
| JP | 2001-48940 A | 2/2001 |
| JP | 2001-64313 A | 3/2001 |
| JP | 2002-187908 A | 7/2002 |
| JP | 2002-256012 A | 9/2002 |
| JP | 2004-27179 A | 1/2004 |
| JP | 2004-513998 A | 5/2004 |
| WO | 00/52062 | 9/2000 |
| WO | 02/38635 | 5/2002 |

* cited by examiner

*Primary Examiner*—Fred M Teskin
(74) *Attorney, Agent, or Firm*—Sughrue Mion, PLLC

(57) ABSTRACT

This invention is concerned with a butadiene-based polymer having a high cis-1,4 bond content, a low vinyl bond content and a molecular weight distribution of a specified range, and more particularly a butadiene-based polymer having a 1,3-butadiene monomer unit, characterized in that a cis-1,4 bond content and a vinyl bond content in the 1,3-butadiene monomer unit as measured by a Fourier transform infrared spectroscopy (FT-IR) is not less than 98.0% and not more than 0.3%, respectively, and a ratio (Mw/Mn) of weight average molecular weight (Mw) to number average molecular weight (Mn) is 1.6-3.5.

12 Claims, No Drawings

BUTADIENE-BASED POLYMER AND METHOD OF PRODUCING THE SAME AS WELL AS RUBBER COMPOSITION AND TIRE USING THE SAME

TECHNICAL FIELD

This invention relates to a butadiene-based polymer and a method of producing the same as well as a rubber composition and tire using the same, and more particularly to a butadiene-based polymer capable of improving the wear resistance, resistance to crack growth and resistance to ozone deterioration of the rubber composition and the tire and not deteriorating the workability of the rubber composition.

BACKGROUND ART

Heretofore, the butadiene-based polymer such as polybutadiene or the like has been known as a rubber having excellent thermal and mechanical properties, and is widely used in various fields. Particularly, the butadiene-based polymer being high in the cis-1,4 bond content in butadiene monomer unit is excellent in the mechanical properties, so that the production technique of the butadiene-based polymer having a high cis-1,4 bond content is strenuously studied and developed. For example, a composite catalyst system composed mainly of a compound of a transition metal such as nickel, cobalt, titanium or the like is known as a catalyst for the production of the butadiene-based polymer, and some systems are industrially used as a polymerization catalyst for butadiene.

Also, a composite catalyst system comprising a rare earth metal compound and an organometallic compound of Groups I-III is developed as a catalyst capable of producing the butadiene-based polymer with a high cis-1,4 bond content and having an excellent polymerization activity. For example, it is known that when using a catalyst system comprising a neodymium compound and, methylaluminoxane the polymerization can be conducted in a high reactivity and a conjugated diene polymer having a narrow molecular weight distribution is obtained. However, the polymer obtained by this method is not sufficiently high in the cis-1,4 bond content and also a vinyl bond content is not sufficiently low, so that the properties are still insufficient.

JP-A-2001-48940 discloses that the butadiene-based polymer having a very high cis-1,4 bond content is obtained by polymerizing butadiene in a catalyst system comprising a rare earth metal compound, an organometallic compound of Groups I-III and an ionic compound consisting of a non-coordinate anion and cation. In this case, however, there are problems that a special compound such as $Nd(OCOCCl_3)_3$ or the like is used as a rare earth metal compound and this compound has a low polymerization activity. Also, since NMR is utilized as a measurement of the micro-structure in JP-A-2001-48940, the error of the vinyl bond content is particularly large and further the value of the vinyl bond content in the resulting butadiene polymer is large, so that the rubber composition containing such a butadiene-based polymer is insufficient in the improvement of the properties as compared with the rubber composition containing the conventional butadiene polymer. Furthermore, the butadiene-based polymer obtained by this method tends to widen the molecular weight distribution as the vinyl bond content becomes low, so that there can not be obtained butadiene-based polymers in which the vinyl bond content is sufficiently low and the molecular weight distribution is within a specified range.

Also, JP-A-2002-241420 discloses that the butadiene-based polymer having a very high cis-1,4 bond content is obtained by polymerizing butadiene in a catalyst system comprising a rare earth metal salt consisting of a rare earth metal, a free halogen atom component and a halogen atom containing component and aluminoxane. In this case, however, there are problems that a special catalyst such as bis(trichloroacetic acid)(versatic acid) neodymium salt or the like is used and the polymerization activity of such a neodymium salt is low and the industrial productivity is low. Furthermore, JP-A-2002-241420 does not examine the vinyl bond content of the polymer at all.

In Aida, Hou, Nishiura, Doi, Kurakado, Horiuchi and Wakatsuki, *Macromol. Rapid Commun.* 2003, vol. 24, pp. 179-184, is disclosed that the polybutadiene-based polymer having a very high cis-1,4 bond content is obtained by polymerizing butadiene in a catalyst system comprising a metallocene complex of a gadolinium compound. In this case, however, there are problems that the molecular weight distribution of the polymer having a high cis-1,4 bond content is very low of not more than 1.5 and the rubber composition containing such a polymer is low in the workability and difficult in the milling and can not develop the excellent properties. Also, the butadiene-based polymer having a very high cis-1,4 bond content obtained by this method is too high in the molecular weight and has a problem that the workability is very poor in the usual rubber working machine. Further, means for controlling the molecular weight is not disclosed in the above Aida et al report, so that the practicality is low.

DISCLOSURE OF THE INVENTION

It is, there, an object of the invention to provide a butadiene-based polymer having a high cis-1,4 bond content, a low vinyl bond content and particular ranges of molecular weight and molecular weight distribution. It is another object of the invention to provide a rubber composition containing such a butadiene-based polymer and having excellent wear resistance, resistance to crack growth, resistance to ozone deterioration and workability and a tire using such a rubber composition in at least any member.

The inventors have made various studies for achieving the above objects and found that a butadiene-based polymer having a high cis-1,4 bond content, a low vinyl bond content and particular ranges of molecular weight and molecular weight distribution is obtained by polymerizing monomers inclusive of butadiene in a specified catalyst while controlling a reaction temperature and further a rubber composition containing such a butadiene-based polymer has excellent wear resistance, resistance to crack growth, resistance to ozone deterioration and workability, and as a result, the invention has been accomplished.

That is, the invention is a butadiene-based polymer having a 1,3-butadiene monomer unit, characterized in that a cis-1,4 bond content and a vinyl bond content in the 1,3-butadiene monomer unit as measured by a Fourier transform infrared spectroscopy (FT-IR) is not less than 98.0% and not more than 0.3%, respectively, and a ratio (Mw/Mn) of weight average molecular weight (Mw) to number average molecular weight (Mn) is 1.6-3.5. In this case, the cis-1,4 bond content and vinyl bond content defining the butadiene-based polymer of the invention are values measured by FT-IR, which are concretely measured by the following method.

<Analysis of micro-structures through FT-IR>

Using carbon disulfide as a blank in the same cell, FT-IR permeability spectrum of a solution of a butadiene-based polymer adjusted to a concentration of 5 mg/mL in carbon disulfide is measured. In this spectrum, when a mountain peak value near to 1130 cm$^{-1}$ is a and a valley peak value near to 967 cm$^{-1}$ is b, a valley peak value near to 911 cm$^{-1}$ is c and a valley peak value near to 736 cm$^{-1}$ is d, values of e, f and g are derived from the following matrix representation (III):

$$\begin{pmatrix} 1.7455 & 0 & -0.0151 \\ -0.0454 & 0.4292 & -0.0129 \\ -0.007 & 0 & 0.3746 \end{pmatrix} \begin{pmatrix} \log_{10}(a/d) \\ \log_{10}(a/b) \\ \log_{10}(a/c) \end{pmatrix} = \begin{pmatrix} e \\ f \\ g \end{pmatrix} \quad (III)$$

and then cis-1,4 bond content, trans-1,4 bond content and vinyl bond content are calculated by using these values according to the following equations (IV), (V) and (VI):

(cis-1,4 bond content)=e/(e+f+g)×100(%)    (IV)

(trans-1,4 bond content)=f/(e+f+g)×100(%)    (V)

(vinyl bond content)=g/(e+f+g)×100(%)    (VI)

Moreover, the mountain peak value a near to 1130 cm$^{-1}$ in the above spectrum indicates a base line, and the valley peak value b near to 967 cm$^{-1}$ indicates trans-1,4 bond, and the valley peak value c near to 911 cm$^{-1}$ indicates vinyl bond, and the valley peak value d near to 736 cm$^{-1}$ indicates cis-1,4 bond.

As an analysis of the micro-structure of 1,3-butadiene monomer unit in the butadiene-based polymer has hitherto been known a method of measuring the cis-1,4 bond content, trans-1,4 bond content and vinyl bond content through $^1$H-NMR and $^{13}$C-NMR. However, in the measured result through $^{13}$C-NMR, the vinyl bond content is under-estimated to become a value smaller than the actual value. On the contrary, since the butadiene-based polymer of the invention is characterized by having a high cis-1,4 bond content and a very low vinyl bond content, it is measured by the FT-IR method in which the measuring accuracy of the vinyl bond content is high.

In a preferable embodiment of the butadiene-based polymer of the invention, the cis-1,4 bond content and the vinyl bond content satisfy a relationship of the following equation (I):

(vinyl bond content)≦0.25×((cis-1,4 bond content)−97)(%)    (I)

In another preferable embodiment of the butadiene-based polymer of the invention, the ratio (Mw/Mn) of weight average molecular weight (Mw) to number average molecular weight (Mn) is 1.6-2.7.

The butadiene-based polymer of the invention is preferable to consist of 80-100% by mass of 1,3-butadiene monomer unit and 20-0% by mass of the other monomer unit capable of copolymerizing with 1,3-butadiene. In this case, the butadiene-based polymer of the invention is further preferable to be polybutadiene made of only 1,3-butadiene monomer unit.

Further, the butadiene-based polymer of the invention is preferable to have the number average molecular weight (Mn) of 100,000-500,000, preferably 150,000-300,000.

Also, the production method of the butadiene-based polymer of the invention is characterized in that monomers at least containing 1,3-butadiene is polymerized at a temperature of not higher than 25° C. in the presence of a catalyst system comprising (A) component: a compound containing a rare earth element of Atomic Number 57-71 in the Periodic Table or a reaction product of such a compound with a Lewis base;

(B) component: an organoaluminum compound represented by the following general formula (II):

(wherein R$^1$ and R$^2$ are the same or different and are hydrocarbon group having a carbon number of 1-10 or a hydrogen atom, and R$^3$ is a hydrocarbon group having a carbon number of 1-10 provided that R$^3$ may be the same as or different from R$^1$ or R$^2$); and (C) component: at least one of Lewis acid, a complex compound of a metal halogen compound and Lewis base and an organic compound containing an active halogen.

In a preferable embodiment of the production method of the butadiene-based polymer of the invention, the rare earth element containing compound in the component (A) is a salt of neodymium soluble in a hydrocarbon solvent, and is further preferable to be a branched carboxylate of neodymium or a reaction product of such a salt with a Lewis base.

In another preferable embodiment of the production method of the butadiene-based polymer of the invention, the catalyst system further contains (D) component: an aluminoxane. In this case, the catalyst system is further preferable to be previously prepared in the presence of component (A), component (B), component (C), component (D) and a conjugated diene monomer.

Furthermore, the rubber composition of the invention is characterized in that a rubber component contains not less than 10% by mass of the butadiene-based polymer.

The rubber composition of the invention is preferable to be compounded with not less than 10 parts by mass of a filler based on 100 parts by mass of the rubber component. Also, the rubber composition is preferable to be sulfur crosslinkable.

Moreover, the tire of the invention is characterized in that the rubber composition is used in any member of the tire.

BEST MODE FOR CARRYING OUT THE INVENTION

The invention will be described in detail below.

(Butadiene-Based Polymer)

The butadiene-based polymer of the invention contains 1,3-butadiene monomer unit, and is characterized in that a cis-1,4 bond content and a vinyl bond content in the 1,3-butadiene monomer unit as measured by a Fourier transform infrared spectroscopy (FT-IR) is not less than 98.0% and not more than 0.3%, respectively, and a ratio (Mw/Mn) of weight average molecular weight (Mw) to number average molecular weight (Mn) is 1.6-3.5. Since the butadiene-based polymer is high in the cis-1,4 bond content in 1,3-butadiene monomer unit and low in the vinyl bond content as compared with the conventional butadiene-based polymer, the extension crystallinity is considerably high, and the wear resistance, resistance to crack growth and resistance to ozone deterioration of the rubber composition can be largely improved by compounding such a butadiene-based polymer into the rubber composition. Also, since the ratio (Mw/Mn) of weight average molecular weight (Mw) to number average molecular weight (Mn) in the butadiene-based polymer is the above range, even when the butadiene-based polymer is compounded into the rubber composition, the milling is easy without deteriorating the workability of the rubber composition and the properties of the rubber composition can be sufficiently improved.

In the butadiene-based polymer of the invention, the cis-1,4 bond content is not less than 98.0% and the vinyl bond content is not more than 0.3%. When the cis-1,4 bond content is less than 98.0%, or when the vinyl bond content exceeds 0.3%, the extension crystallinity of the butadiene-based polymer is insufficient and the effect of improving the wear resistance, resistance to crack growth and resistance to ozone deterioration of the rubber composition is small. Also, the cis-1,4 bond content and vinyl bond content in the butadiene-based polymer is preferable to satisfy the relations-hip of the following equation (I):

$$(\text{vinyl bond content}) \leq 0.25 \times ((\text{cis-1,4 bond content}) - 97)(\%) \qquad (I)$$

In this case, the extension crystallinity of the butadiene-based polymer is further improved, and the wear resistance, resistance to crack growth and resistance to ozone deterioration of the rubber composition can be further improved by compounding such a butadiene-based polymer into the rubber composition.

In the butadiene-based polymer of the invention, the ratio (Mw/Mn) of weight average molecular weight to number average molecular weight (Mn), i.e. molecular weight distribution (Mw/Mn) is required to be 1.6-3.7, and is preferable to be 1.6-2.7. In this case, the weight average molecular weight (Mw) and the number average molecular weight (Mn) are values converted to polystyrene as measured by a gel permeation chromatography (GPC). When the molecular weight distribution (Mw/Mn) of the butadiene-based polymer is less than 1.6, the workability of the rubber composition containing such a butadiene-based polymer is deteriorated and the milling is difficult and the properties of the rubber composition can not be improved sufficiently. While, when the molecular weight distribution of the butadiene-based polymer exceeds 3.5, the viscosity of the rubber composition at an uncured state is improved, but the deterioration of the rubber properties such as hysteresis loss and the like becomes undesirably large.

In the butadiene-based polymer of the invention, the number average molecular weight (Mn) is preferably 100,000-500,000, more preferably 150,000-300,000. When the number average molecular weight of the butadiene-based polymer is less than 100,000, the modulus of elasticity in a vulcanizate lowers and the hystresis loss rises and further the wear resistance is deteriorated, while when it exceeds 500,000, the workability of the rubber composition containing such a butadiene-based polymer is deteriorated and the milling becomes difficult and the properties of the rubber composition can not be improved sufficiently.

In the butadiene-based polymer of the invention, it is preferable that the 1,3-butadiene monomer unit is 80-100% by mass and the other monomer unit capable of copolymerizing with 1,3-butadiene is 20-0% by mass. When the content of 1,3-butadiene monomer unit in the polymer is less than 80% by mass, the cis-1,4 bond content based on the whole of the polymer lowers and the effect of the invention is hardly developed. Moreover, the butadiene-based polymer of the invention is preferable to be made of only 1,3-butadiene monomer, and is particularly preferable to be polybutadiene rubber (BR).

As the other monomers capable of copolymerizing with 1,3-butadiene are mentioned, for example, a conjugated diene monomer having a carbon number of 5-8, an aromatic vinyl monomer and the like. Among them, the conjugated diene monomer having a carbon number of 5-8 is preferable. As the conjugated monomers having a carbon number of 5-8 are mentioned 2-methyl-1,3-butadiene, 2,3-dimethyl-1,3-butadiene, 1,3-pentadiene, 1,3-hexadiene and the like. As the aromatic vinyl monomers are mentioned styrene, p-methylstyrene, α-methylstyrene, vinylnaphthalene and the like.

(Production Method of Butadiene-Based Polymer)

The butadiene-based polymer is obtained by polymerizing monomers at least including 1,3-butadiene at a temperature of not higher than 25° C. in the presence of a catalyst system comprising components (A), (B) and (C) as mentioned in detail below. As the monomer are mentioned 1,3-butadiene and the above other monomers capable of copolymerizing with 1,3-butadiene.

The component (A) in the catalyst system used in the production of the butadiene-based polymer of the invention is a compound containing a rare earth element of Atomic Number 57-71 in the Periodic Table, or a reaction product of such a compound with a Lewis base. Among the rare earth elements of Atomic Number 57-71, neodymium, praseodymium, cerium, lanthanum, gadolinium and a mixture thereof are preferable, and neodymium is particularly preferable.

As the rare earth element containing compound is preferable a salt soluble in a hydrocarbon solvent. Concretely, there are mentioned carboxylates, alkoxides, β-diketone complexes, phosphates and phosphites of the above rare earth elements. Among them, the carboxylates and phosphates are preferable, and the carboxylates are particularly preferable. As the hydrocarbon solvent are mentioned saturated aliphatic hydrocarbons having a carbon number of 4-10 such as butane, pentane, hexane, heptane and the like; saturated alicyclic hydrocarbons having a carbon number of 5-20 such as cyclopentane, cyclohexane and the like; monoolefins such as 1-butene, 2-butene and the like; aromatic hydrocarbons such as benzene, toluene, xylene and the like; and halogenated hydrocarbons such as methylene chloride, chloroform, trichloroethylene, perchloroethylene, 1,2-dichloroethane, chlorobenzene, bromobenzene, chlorotoluene and the like.

As the carboxylate of the rare earth element are compounds represented by the following general formula (VII):

$$(R^4\text{---}CO_2)_3M \qquad (VII)$$

(wherein $R^4$ is a hydrocarbon group having a carbon number of 1-20, and M is a rare earth element of Atomic Number 57-71 in the Periodic Table). In this case, $R^4$ may be saturated or unsaturated, and is preferable to be an alkyl group or an alkenyl group, and may be straight-chain, branched-chain or cyclic. Also, the carboxyl group is bonded to a primary, secondary or tertiary carbon atom. As the carboxylate are concretely mentioned salts of octanoic acid, 2-ethylhexanoic acid, oleic acid, neodecanoic acid, stearic acid, benzoic acid, naphthenic acid, versatic acid (trade name of Shell Chemical Co., Ltd., carboxylic acid in which carboxyl group is bonded to a tertiary carbon atom) and the like. Among them, salts of 2-ethylhexanoic acid, neodecanoic acid, naphthenic acid and versatic acid are preferable.

As the alkoxide of the rare earth element are mentioned compounds represented by the following general formula (VIII):

$$(R^5O)_3M \quad \text{(VIII)}$$

(wherein $R^5$ is a hydrocarbon group having a carbon number of 1-20, and M is a rare earth element of Atomic Number 57-71 in the Periodic Table). As the alkoxy group represented by $R^5O$ are mentioned 2-ethyl-hexylalkoxy group, oleylalkoxy group, stearylalkoxy group, phenoxy group, benzylalkoxy group and the like. Among them, 2-ethyl-kexylalkoxy group and benzylalkoxy group are preferable.

As the β-diketone complex of the rare earth element are mentioned acetylacetone complex, benzoylacetone complex, propionitrileacetone complex, valerylacetone complex, ethylacetyl-acetone complex of the rare earth element and the like. Among them, the acetylacetone complex and ethylacetylacetone complex are preferable.

As the phosphate and phosphite of the rare earth element are mentioned salts of the rare earth element with phosphoric acid bis(2-ethylhexyl), phosphoric acid bis(1-methylheptyl), phosphoric acid bis(p-nonylphenyl), phosphoric acid bis (polyethyleneglycol-p-nonylphenyl), phosphoric acid (1-methylheptyl)(2-ethylhexyl), phosphoric acid (2-ethylhexyl)(p-nonylphenyl), 2-ethylhexyl phosphonic acid mono-2-ethylhexyl, 2-ethylhexyl phosphonic acid mono-p-nonylphenyl, bis(2-ethylhexyl) phosphic acid, bis(1-methylheptyl) phosphic acid, bis(p-nonylphenyl) phosphic acid, (1-methylheptyl)(2-ethylhexyl) phosphic acid, (2-ethylhexyl)(p-nonylphenyl) phosphic acid and the like. Among them, the salts of the rare earth element with phosphoric acid (2-ethylhexyl), phosphoric acid bis(1-methylheptyl), 2-ethylhexyl phosphonic acid mono-2-ethylhexyl and bis(2-ethylhexyl) phosphonic acid are preferable.

Among the above rare earth element-containing compounds, phosphates of neodymium and carboxylates of neodymium are further preferable, and branched carboxylates of neodymium such as neodymium 2-ethylhexanoate, neodymium neodecanoate, neodymium versatate and the like are most preferable.

Also, the component (A) may be a reaction product of the rare earth element-containing compound with a Lewis base. This reaction product improves the solubility of the rare earth element-containing compound into a solvent through the Lewis base and can stably store for a long time of period. The Lewis base used for easily solubilizing the rare earth element-containing compound into the solvent and stably storing for a long time of period is used at a ratio of 0-30 mol, preferably 1-10 mol per 1 mol of the rare earth element as a mixture of both or a product previously reacting them. As the Lewis base are mentioned acetylacetone, tetrahydrofuran, pyridine, N,N-dimethylformamide, thiophene, dipheylether, triethylamine, organophosphorus compounds, and monovalent or divalent alcohols.

As the component (A), the rare earth element-containing compounds and reaction products of the compounds with the Lewis bases may be used alone or in a combination of two or more.

The component (B) in the catalyst system used in the production of the butadiene-based polymer of the invention is an organoaluminum compound represented by the following general formula (II):

$$AlR^1R^2R^3 \quad \text{(II)}$$

(wherein $R^1$ and $R^2$ are the same or different and are hydrocarbon group having a carbon number of 1-10 or a hydrogen atom, and $R^3$ is a hydro-carbon group having a carbon number of 1-10 provided that $R^3$ may be the same as or different from $R^1$ or $R^2$). As the organoaluminum compound of the formula (II) are mentioned trimethylaluminum, triethylaluminum, tri-n-propylaluminum, triisopropylaluminum, tri-n-butylaluminum, triisobutylaluminum, tri-t-butylaluminum, tripentylaluminum, trihexylaluminum, tricyclohexylaluminum, trioctylaluminum, hydrogenated diethylaluminum, hydrogenated di-n-propylaluminum, hydrogenated di-n-butylaluminum, hydrogenated diisobutylaluminum, hydrogenated dihexylaluminum, hydrogenated diisohexylaluminum, hydrogenated dioctylaluminum, hydrogenated diisooctylaluminum, ethylaluminum dihydride, n-propylaluminum dihydride, isobutylaluminum dihydride and the like. Among them, triethylaluminum, triisobutylaluminum, hydrogenated diethylaluminum and hydrogenated diisobutylaluminum are preferable. As the component (B), the above organoaluminum compounds may be used alone or in a combination of two or more.

The component (C) in the catalyst system used in the production of the butadiene-based polymer of the invention is a Lewis acid, a complex compound of a metal halogen compound and a Lewis base, or at least one halogen compound selected from organic compounds containing an active halogen.

The Lewis acid has a Lewis acidity and is soluble in a hydrocarbon. Concretely, there can be mentioned methylaluminum dibromide, methylaluminum dichloride, ethylaluminum dibromide, ethylaluminum dichloride, butylaluminum dibromide, butylaluminum dichloride, dimethylaluminum bromide, dimethylaluminum chloride, diethylaluminum bromide, diethylaluminum chloride, dibutylaluminum bromide, dibutylaluminum chloride, methylaluminum sesquibromide, methylaluminum sesquichloride, ethylaluminum sesquibromide, ethylaluminum sesquichloride, dibutyltin dichloride, aluminum tribromide, antimony trichloride, antimony pentachloride, phosphorus trichloride, phosphorus pentachloride, tin tetrachloride, silicon tetrachloride and the like. Among them, diethylaluminum chloride, ethylaluminum sesquichloride, ethylaluminum dichloride, diethyl-aluminum bromide, ethylaluminum sesquibromide and ethylaluminum dibromide are preferable. Also, a reaction product between an alkylaluminum and a halogen such as a reaction product of triethylaluminum and bromide can be used.

As the metal halogen compound constituting the complex compound of the metal halogen compound and Lewis base are mentioned beryllium chloride, beryllium bromide, beryllium iodide, magnesium chloride, magnesium bromide, magnesium iodide, calcium chloride, calcium bromide, calcium iodide, barium chloride, barium bromide, barium iodide, zinc chloride, zinc bromide, zinc iodide, cadmium chloride, cadmium bromide, cadmium iodide, mercury chloride, mercury bromide, mercury iodide, manganese chloride, manganese bromide, manganese iodide, rhenium chloride, rhenium bromide, rhenium iodide, copper chloride, copper bromide, copper iodide, silver chloride, silver bromide, silver iodide, gold chloride, gold bromide, gold iodide and the like. Among them, magnesium chloride, calcium chloride, barium chloride, manganese chloride, zinc chloride and copper chloride are preferable, and magnesium chloride, manganese chloride, zinc chloride and copper chloride are particularly preferable.

As the Lewis base constituting the complex compound of the metal halogen compound and Lewis base are preferable a phosphorus compound, a carbonyl compound, a nitrogen compound, an ether compound, an alcohol and the like. There are concretely mentioned tributyl phosphate, tri-2-ethylhexyl phosphate, triphenyl phosphate, tricresyl phosphate, triethyl phosphine, tributyl phosphine, triphenyl phosphine, diethyl phosphinoethane, diphenyl phosphinoethane, acetylacetone, benzoyl acetone, propyionitrile acetone, valeryl acetone, ethylacetyl acetone, methyl acetoacetate, ethyl acetoacetate, phenyl acetoacetate, dimethyl malonate, diethyl malonate, diphenyl malonate, acetic acid, octanoic acid, 2-ethyl-hexanoic acid, oleic acid, stearic acid, benzoic acid, naphthenic acid, versatic acid, triethylamine, N,N-dimethyl acetoamide, tetrahydrofuran, diphenyl ether, 2-ethyl-hexyl alcohol, oleyl alcohol, stearyl alcohol, phenol, benzyl alcohol, 1-decanol, lauryl alcohol and the like. Among them, tri-2-ethylhexyl phosphate, tricresyl phosphate, acetylacetone, 2-ethylhexanoic acid, versatic acid, 2-ethylhexyl alcohol, 1-decanol and lauryl alcohol are preferable.

The Lewis base is reacted at a ratio of 0.01-30 mol, preferably 0.5-10 mol per 1 mol of the metal halogen compound. By using the reaction product with the Lewis base, metal remaining in the polymer can be decreased.

As the organic compounds containing the active halogen are mentioned benzyl chloride and the like.

In the catalyst system used in the production of the butadiene-based polymer of the invention, it is preferable to further add an organoaluminumoxy compound, so-called aluminoxane as a component (D) in addition to the above components (A)-(C). As the aluminoxane are mentioned methyl aluminoxane, ethyl aluminoxane, propyl aluminoxane, butyl aluminoxane, chloroaluminoxane and the like. By adding aluminoxane as a component (D), the molecular weight distribution becomes sharp and the activity as a catalyst is improved.

The amount of each component in the catalyst system used in the invention or the composition ratio is properly selected in accordance with the purpose or necessity. In this case, the component (A) is preferably used in an amount of 0.00001-1.0 millimol, more preferably 0.0001-0.5 millimol per 100 g of 1,3-butadiene. When the amount of the component (A) used is less than 0.00001 millimol, the polymerization activity becomes low, while when it exceeds 1.0 millimol, the concentration of the catalyst becomes high and the deashing step is required. Also, the ratio of component (A) and component (B) as a molar ratio is component (A):component (B) of 1:1-1:700, preferably 1:3-1:500. Furthermore, the ratio of halogen in component (A) and component (C) as a molar ratio is 1:0.1-1:30, preferably 1:0.2-1:15, more preferably 1:2.0-1:5.0. Moreover, the ratio of aluminum in component (D) and component (A) as a molar ratio is 1:1-700:1, preferably 3:1-500:1. When the catalyst amount or composition ratio is outside the above range, the catalyst does not act in a high activity or a step of removing the catalyst residue is undesirably required. Further, the polymerization reaction can be conducted in a co-presence of a hydrogen gas in addition to the above components (A)-(C) for the purpose of adjusting the molecular weight of the polymer.

As a catalyst component other than the above components (A)-(C), a small amount of a conjugated diene monomer such as 1,3-butadiene or the like may be used, if necessary, and concretely it is used at a ratio of 0-100 mol per 1 mol of the compound of the component (A). Although the conjugated diene monomer such as 1,3-butadiene or the like is not essential as a catalyst component, when using it, there is a merit of more improving the catalyst activity.

The production of the catalyst is carried out, for example, by dissolving the components (A)-(C) in a solvent and, if necessary, further reacting with 1,3-butadiene. In this case, the addition order of the components is not particularly limited, and further aluminoxane may be added as a component (D). From a viewpoint of the improvement of the polymerization activity and the shortening of the induction period for polymerization initiation, it is preferable that these components are previously mixed and reacted and maturated. In this case, the maturation temperature is 0-100° C., preferably 20-80° C. When the temperature is less than 0° C., the sufficient maturation is not conducted, while when it exceeds 100° C., the lowering of the catalyst activity and the widening of the molecular weight distribution occur. Also, the maturation time is not particularly limited. The maturation can be carried out by contacting in a line before the addition to the polymerization reaction tank. Usually, the time is sufficient to be not less than 0.5 minute, and the maturation is stable over several days.

The production of the butadiene-based polymer is preferable to be carried out by a solution polymerization. In case of the solution polymerization, an inert organic solvent is used as a polymerization solvent. As the inert organic solvent are mentioned saturated aliphatic hydrocarbons having a carbon number of 4-10 such as butane, pentane, hexane, heptane and the like; saturated alicyclic hydrocarbons having a carbon number of 5-20 such as cyclopentane, cyclohexane and the like; monoolefins such as 1-butene, 2-butene and the like; aromatic hydrocarbons such as benzene, toluene, xylene and the like; and halogenated hydrocarbons such as methylene chloride, chloroform, carbon tetarchloride, trichloroethylene, perchloroethylene, 1,2-dichloroethane, chlorobenzene, bromobenzene, chlorotoluene and the like. Among them, the aliphatic hydrocarbons and alicyclic hydro-carbons having a carbon number of 5-6 are particularly preferable. These solvents may be used alone or in a combination of two or more.

The production of the butadiene-based polymer is required to be carried out at a polymerization temperature of not higher than 25° C., and is preferable to be carried out at 10 to −78° C. When the polymerization temperature exceeds 25° C., the polymerization reaction can not be controlled sufficiently, and the cis-1,4 bond content in the resulting butadiene-based polymer lowers and the vinyl bond content rises. Also, when the polymerization temperature is less than −78° C., it dips from the solidification point of the solvent and hence the polymerization can not be conducted.

The production of the butadiene-based polymer may be carried out by either batch system or continuous system. In the production of the butadiene-based polymer, it is necessary to take a care so that a compound having a deactivation such as oxygen, water, carbon dioxide gas or the like is not incorporated into the polymerization reaction system as far as possible for deactivate the above catalyst containing the rare earth element compound and the polymer.

(Rubber Composition)

The rubber composition of the invention is characterized in that the rubber component constituting the rubber composition contains not less than 10% by mass of the above butadiene-based polymer. When the content of the butadiene-based polymer in the rubber component is less than 10% by mass, the effect of improving the wear resistance, resistance to crack growth and resistance to ozone deterioration of the rubber composition is small. As the rubber component in the rubber composition of the invention, natural rubber (NR), polyisoprene rubber (IR) or the like can be used together in addition to the butadiene-based polymer.

The rubber composition of the invention is preferable to be compounded with not less than 10 parts by mass of a filler based on 100 parts by mass of the rubber component. By including not less than 10 parts by mass of the filler is more improved the reinforcing property of the rubber composition. As the filler are mentioned carbon black, silica and the like.

Also, the rubber composition of the invention is preferable to be sulfur crosslinkable. The vulcanized rubber obtained by crosslinking the rubber composition with sulfur has a sufficient strength as a tire member. Moreover, the rubber composition of the invention is excellent in the wear resistance, so that it is suitable as a tread of the tire. Also, the resistance to crack growth and resistance to ozone deterioration are excellent, so that the rubber composition is also suitable as a sidewall of the tire. Furthermore, the workability is excellent, so that the milling is easy and the high properties can be developed.

In addition to the above rubber component and filler in the rubber composition, additives usually used in the rubber industry such as vulcanizing agent, vulcanization accelerator, antioxidant, scorch retarder, softening agent, zinc oxide, stearic acid, silane coupling agent and the like may be properly selected and compounded within a scope not damaging the object of the invention. As these additives can be preferably used commercially available ones. Moreover, the rubber composition can be produced by compounding the rubber component with various additives properly selected, if necessary, and then milling, warming up, extruding and the like.

(Tire)

The tire of the invention is characterized in that the above rubber composition is used in any member of the tire, and is excellent in the wear resistance, resistance to crack growth and resistance to ozone deterioration. The tire of the invention is not particularly limited as far as the rubber composition is used in any member. As the member are mentioned a tread, a sidewall and the like, which can be produced by the usual manner.

The following examples are given in illustration of the invention and are not intended as limitations thereof.

POLYMER PRODUCTION EXAMPLE 1

<Preparation of Catalyst>

Into a glass bottle of 100 mL capacity dried and purged with nitrogen and provided with rubber plug are successively charged 7.11 g of a solution of butadiene in cyclohexane (butadiene concentration: 15.2% by mass), 0.59 mL of a solution of neodymium neodecanoate in cyclohexane (neodymium concentration: 0.56 M), 10.32 mL of a solution of methylaluminoxane (MAO) (PMAO made by Toso Finechem Co., Ltd.) in toluene (aluminum concentration: 3.23 M) and 7.77 mL of a solution of hydrogenated diisobutylaluminum (made by Kantou Kagaku Co., Ltd.) in hexane (0.90 M), which are maturated at room temperature for 2 minutes, and then 1.45 mL of a solution of diethylaluminum chloride (made by Kantou Kagaku Co., Ltd.) in hexane (0.95 M) is added and maturated at room temperature for 15 minutes while stirring at moments. The neodymium concentration in the thus obtained catalyst solution is 0.011 M (mol/L).

<Production of Polymer A>

Into a glass bottle of about 1 L capacity dried and purged with nitrogen and provided with rubber plug are charged a solution of dried and purified 1,3-butadiene in cyclohexane and a dried cyclohexane at a state of charging 400 g of the cyclohexane solution of butadiene (butadiene concentration: 5.0% by mass), which is well cooled in a water bath of 10° C. Then, 1.56 mL of the above catalyst solution (0.017 mmol by neodymium conversion) is added to conduct the polymerization in the water bath of 10° C. for 3.5 hours. Thereafter, 2 mL of a solution of 2,2'-methylene-bis(4-ethyl-6-t-butylphenol) (antioxidant NS-5) in isopropanol is added to stop the reaction, and further the reprecipitation is carried out in an isopropanol solution containing a slight amount of NS-5 and the drying is conducted by a usual manner to obtain a polymer A in a yield of approximately 100%.

POLYMER PRODUCTION EXAMPLE 2

<Preparation of Catalyst>

Into a glass bottle of 100 mL capacity dried and purged with nitrogen and provided with rubber plug are successively charged 7.11 g of a solution of butadiene in cyclohexane (butadiene concentration: 15.2% by mass), 0.59 mL of a solution of neodymium neodecanoate in cyclohexane (neodymium concentration: 0.56 M), 10.32 mL of a solution of methylaluminoxane (MAO) (PMAO made by Toso Finechem Co., Ltd.) in toluene (aluminum concentration: 3.23 M) and 7.77 mL of a solution of hydrogenated diisobutylaluminum (made by Kantou Kagaku Co., Ltd.) in hexane (0.90 M), which are maturated at room temperature for 2 minutes, and then 2.36 mL of a solution of diethylaluminum chloride (made by Kantou Kagaku Co., Ltd.) in hexane (0.95 M) is added and maturated at room temperature for 15 minutes while stirring at moments. The neodymium concentration in the thus obtained catalyst solution is 0.011 M (mol/L).

<Production of Polymer B>

Into a glass bottle of about 1 L capacity dried and purged with nitrogen and provided with rubber plug are charged a solution of dried and purified 1,3-butadiene in cyclohexane and a dried cyclohexane at a state of charging 400 g of the cyclohexane solution of butadiene (butadiene concentration: 5.0% by mass), which is well cooled in a water bath of 7.5° C. Then, 1.60 mL of the above catalyst solution (0.017 mmol by neodymium conversion) is added to conduct the polymerization in the water bath of 7.5° C. for 4 hours. Thereafter, 2 mL of a solution of 2,2'-methylene-bis(4-ethyl-6-t-butylphenol) (antioxidant NS-5) in isopropanol (NS-5 concentration: 5% by mass) is added to stop the reaction, and further the reprecipitation is carried out in an isopropanol solution containing a slight amount of NS-5 and the drying is conducted by a usual manner to obtain a polymer B in a yield of approximately 100%.

POLYMER PRODUCTION EXAMPLES 3 AND 4

Polymers C and D are obtained by using the catalyst solution used in Polymer Production Example 1 and conducting the polymerization under conditions shown in Table 1. In this case, the total amount of butadiene solution charged is 400 g and the yield is approximately 100%.

TABLE 1

|  |  | Polymer A | Polymer B | Polymer C |
|---|---|---|---|---|
| Butadiene concentration in monomer solution | (mass %) | 5.0 | 5.0 | 12.5 |
| Amount of catalyst solution | (mL) | 1.56 | 0.88 | 1.82 |
| Temperature of water bath | (° C.) | 10 | 30 | 50 |
| Polymerization time | (hours) | 3.5 | 3.0 | 1.5 |
| Yield | (%) | 100 | 100 | 100 |

POLYMER PRODUCTION EXAMPLE 5

Into a pressure glass bottle of 1 liter sufficiently dried under an inert gas atmosphere is charged bispentamethyl cyclopentadienyl gadolinium tetrakis(pentafluorophenyl)borate ($[(C_5Me_5)_2Gd][B(C_6F_5)_4]$) (660 mg, 0.60 mmol) and dissolved by adding a solution of triisobutylaluminum in toluene (0.1 M, 30 mL), which is sealed with a bottle crown cap provided with rubber plug. After this reaction vessel is well cooled in a cold bath of −20° C., a toluene solution of butadiene previously cooled to −20° C. (6.5% by mass, 250 g) is added to conduct the polymerization reaction in a cold bath of −20° C. for 30 minutes. Thereafter, 2 mL of an isopropanol solution of 2,2'-methylene-bis(4-ethyl-6-t-butylphenol) as an antioxidant (NS-5)(NS-5 concentration: 5% by mass) is added to stop the reaction, and further the reprecipitation is carried out in an isopropanol solution containing slight amounts of NS-5 and hydrochloric acid and the drying is conducted by a usual manner to obtain a polymer E in a yield of 94%.

POLYMER PRODUCTION EXAMPLE 6

There is prepared $Nd(OCOCCl_3)_3$ according to the method described in JP-A-2001-48940. Into a pressure glass bottle of 1 liter sufficiently dried under an inert gas atmosphere are charged 0.2 mmol of $Nd(OCOCCl_3)_3$ and 204.8 mg of tris(pentafluorophenylborate) $[B(C_6F_5)_3]$, which is sealed with a bottle crown cap provided with rubber plug. Then, a solution of triisobutylaluminum in n-hexane (0.04 M, 150 mL) is added with stirring. To the resulting solution is added a solution of butadiene in n-hexane (24.4% by mass, 222 g) to conduct the polymerization reaction in a warm water of 50° C. for 3 hours with stirring. Thereafter, 2 mL of an isopropanol solution of 2,2'-methylene-bis(4-ethyl-6-t-butylphenol( as an antioxidant (NS-5)(NS-5 concentration: 5% by mass) is added to stop the reaction, and further the reprecipitation is carried out in an isopropanol solution containing slight amounts of NS-5 and hydrochloric acid and the drying is conducted by a usual manner, and further the deashing treatment is carried out by dissolving in cyclohexane solution and reprecipitating with isopropanol acidified with hydrochloric acid and the resulting solid is dried by a usual manner to obtain a polymer F in a yield of 53%.

In Table 2 are shown the properties of the thus obtained polybutadiene rubbers (polymers A-F). Moreover, the analysis of the microstructure is carried out by the aforementioned FT-IR. Also, the weight average molecular weight (Mw), number average molecular weight (Mn) and molecular weight distribution (Mw/Mn) are measured by using a refractometer as a detector through GPC (made by Toso Co., Ltd. HLC-8020) and represented by polystyrene conversion using a monodisperse polystyrene as a standard. Moreover, the column is GMHXL (Toso Co., Ltd.) and the eluting solution is tetrahydrofuran.

TABLE 2

|  | Polymer A | Polymer B | Polymer C | Polymer D | Polymer E | Polymer F |
|---|---|---|---|---|---|---|
| Mn | 205 × 103 | 238 × 103 | 285 × 103 | 219 × 103 | 429 × 103 | 231 × 103 |
| Mw/Mn | 2.3 | 2.3 | 1.8 | 1.7 | 1.4 | 3.8 |
| Measurement | FT-IR | | | | | |
| cis-1,4 bond (5) | 98.43 | 99.00 | 96.90 | 94.34 | 99.42 | 98.76 |
| trans-1,4 bond (%) | 1.44 | 0.86 | 2.78 | 5.11 | 0.46 | 0.86 |
| vinyl bond (%) | 0.13 | 0.14 | 0.33 | 0.55 | 0.12 | 0.38 |

As seen from Table 2, the cis-1,4 bond content, vinyl bond content and molecular weight distribution in the polymers A and B obtained in Polymer Production Examples 1 and 2 are within the ranges defined in the invention. In the polymers C and D obtained in Polymer Production Examples 3 and 4, since the polymerization temperature exceeds 25° C., the cis-1,4 bond content is low and the vinyl bond content is high. Also, the polymer E obtained in Polymer Production Example 5 is very narrow in the molecular weight distribution, and the polymer F obtained in Polymer Production Example 6 is wide in the molecular weight distribution and high in the vinyl bond content.

As a comparison of the measurement, the above FT-IR analysis and the following $^1$H-NMR and $^{13}$C-NMR analyses are carried out with respect to commercially available polybutadiene rubber and the polymer F, whereby the difference between the analytical values based on the difference of the measurement is confirmed. The results are shown in Table 3.

<Analysis of Microstructure through $^1$H-NMR and $^{13}$C-NMR>

The cis-1,4 bond content, trans-1,4 bond content and vinyl bond content are determined by measuring a ratio of 1,4-bond and 1,2-bond in the polymer from $^1$H-NMR analysis (signal intensity ratio of 1,4-bond: 5.30-5.50 ppm and 1,2-bond: 4.94-5.03 ppm) and measuring a ratio of cis bond and trans bond from $^{13}$C-PST-NMR analysis (signal intensity ratio of cis bond: 25.5 ppm and trans bond: 32.8 ppm).

TABLE 3

| Measurement | 150L *1 | | BR01 *2 | | Polymer F | |
|---|---|---|---|---|---|---|
| | FT-IR | $^1$H, $^{13}$C-NMR | FT-IR | $^1$H, $^{13}$C-NMR | FT-IR | $^1$H, $^{13}$C-NMR |
| cis-1,4 bond (%) | 97.18 | 97.24 | 96.29 | 95.49 | 98.76 | 98.81 |
| trans-1,4 bond (%) | 1.19 | 1.39 | 1.50 | 2.72 | 0.86 | 0.90 |
| vinyl bond (%) | 1.63 | 1.37 | 2.20 | 1.79 | 0.38 | 0.29 |

*1 polybutadiene rubber made by Ube Kosan Co., Ltd.
*2 polybutadiene rubber made by JSR Corporation As seen from Table 3, when using 1H-NMR and 13C-NMR, the vinyl bond content is undervalued as compared with FT-IR and is smaller than the actual value.

Furthermore, a rubber composition is prepared according to a compounding recipe shown in Table 4, and the resistance to crack growth, wear resistance, resistance to ozone deterioration and Mooney viscosity are evaluated by the following methods to obtain results shown in Table 5.

(1) Resistance to Crack Growth

A test specimen of JIS No. 3 is provided on its central portion with a crack of 0.5 mm and subjected to repetitive fatigue at room temperature and a strain of 50-100% to measure the repeat number until the specimen is broken. The value at each strain is measured and an average is calculated therefrom, which is represented by an index on the basis that Comparative Example 5 is 100. The larger the index value, the better the resistance to crack growth.

(2) Wear Resistance

A worn amount is measured at room temperature using a Lamborn abrasion testing machine, and a reciprocate of the worn amount is calculated, which is represented by an index on the basis that Comparative Example 5 is 100. The larger the index value, the smaller the worn amount and the better the wear resistance.

(3) Resistance to Ozone Deterioration

The resistance to ozone deterioration is evaluated by observing a surface of a rubber composition after the exposure to ozone for 120 hours according to JIS K6301-1975. In the table, B-2 shows that visually observable cracks are numerously existent, and B-3 shows that deep and relatively large cracks (less than 1 mm) are numerously existent, and B-4 shows that deep and large cracks (not less than 1 mm but less than 3 mm) are numerously existent.

(4) Mooney Viscosity

A Mooney viscosity $ML_{1+4}$ (100° C.) is measured according to JIS K6301 and represented by an index on the basis that Comparative Example 5 is 100. The smaller the index value, the lower the Mooney viscosity.

TABLE 4

| Compounding recipe (parts by mass) | BR | 100.0 |
|---|---|---|
| | Carbon black HAF | 50.0 |
| | Stearic acid | 2.0 |
| | Antioxidant Santite A *3 | 2.0 |
| | Antioxidant 6C *4 | 1.0 |
| | Zinc oxide | 2.5 |
| | Vulcanization accelerator D-G *5 | 0.2 |
| | Vulcanization accelerator DM-P *6 | 0.2 |
| | Vulcanization accelerator NS-P *7 | 0.5 |
| | Sulfur | 1.3 |

*3 Microcrystalline wax, made by Seikou Kagaku Co., Ltd.
*4 N-(1,3-dimethylbutyl)-N'-phenyl-p-phenylene diamine, made by Ohuchi Shinkou Kagaku Co., Ltd., Noclac 6C
*5 N,N'-diphenylguanidine, made by Sanshin Kagaku Kougyo Co., Ltd. Sancelar D-G
*6 dibenzothiazyl disulfide, made by Ohuchi Shinkou Kagaku Co., Ltd., Noccelar DM-P
*7 N-t-butyl-2-benzothiazoryl sulfenamide, made by Ohuchi Shinkou Kagaku Co., Ltd., Noccelar NS-P

TABLE 5

| | Example 1 | Example 2 | Comparative Example 1 | Comparative Example 2 | Comparative Example 3 | Comparative Example 4 | Comparative Example 5 |
|---|---|---|---|---|---|---|---|
| Kind of BR | polymer A | polymer B | polymer C | polymer D | polymer E | polymer F | 150L *1 |
| Resistance to crack growth (index) | 197 | 228 | 121 | 114 | 134 | 174 | 100 |
| Wear resistance (index) | 141 | 141 | 117 | 108 | 113 | 110 | 100 |
| Resistance to ozone deterioration (index) | B-2-B-3 | B-2 | B-2-B-3 | B-2-B-3 | B-2 | B-2-B-3 | B-4 |
| Mooney viscosity (index) | 72 | 88 | 80 | 56 | 244 | 84 | 100 |

*1 same as *1 in Table 3

As seen from Table 5, the resistance to crack growth, wear resistance and resistance to ozone deterioration in the rubber compositions of the examples are considerably improved as compared with the rubber composition of Comparative Example 5. Also, the Mooney viscosity is low and the workability is good.

In the rubber compositions of Comparative Examples 1, 2 and 4 using the polymer with the microstructure outside the range defined in the invention, the improvement of the resistance to crack growth and ear resistance is insufficient as compared with the rubber composition of Comparative Example 5.

In the rubber composition of Comparative Example 3, the molecular weight of the polymer used is high and the molecular weight distribution is too narrow, and hence the Mooney viscosity is considerably high. As a result, the rubber composition of Comparative Example 3 is considerably poor in the workability and difficult in the milling and poor in the dispersion of various additives. Therefore, the improving width of the resistance to crack growth and wear resistance in the rubber composition of Comparative Example 3 is smaller than that presumed from the microstructure of the polymer E.

Then, rubber compositions are prepared according to the compounding recipe shown in Table 4 except that 100 parts by mass of BR in Table 4 is changed into 50.0 parts by mass of BR and 50.0 parts by mass of NR (RSS#4), and the resistance to crack growth, wear resistance, resistance to ozone deterioration and Mooney viscosity are evaluated with respect to the resulting rubber compositions. The results are shown in Table 6. Moreover, the resistance to crack growth, wear resistance and Mooney viscosity in Table 6 are represented by an index on the basis that Comparative Example 8 is 100.

TABLE 6

|  | Example 3 | Example 4 | Comparative Example 6 | Comparative Example 7 | Comparative Example 8 |
|---|---|---|---|---|---|
| Kind of BR | polymer A | polymer B | polymer C | polymer D | 150L *1 |
| Resistance to crack growth (index) | 138 | 145 | 110 | 104 | 100 |
| Wear resistance (index) | 110 | 110 | 103 | 102 | 100 |
| Resistance to ozone deterioration (index) | B-2-B-3 | B-2 | B-2-B-3 | B-2-B-3 | B-3 |
| Mooney viscosity (index) | 96 | 98 | 98 | 92 | 100 |

*1 same as *1 in Table 3

As seen from table 6, the resistance to crack growth, wear resistance and resistance to ozone deterioration in the rubber compositions of the examples are improved as compared with the rubber composition of Comparative Example 8, and also the Mooney viscosity is low and the workability is improved. On the other hand, the improvement of the resistance to crack growth and wear resistance in the rubber compositions of Comparative Examples 6 and 7 using the polymer with the microstructure outside the range defined in the invention is insufficient as compared with the rubber composition of Comparative Example 8.

INDUSTRIAL APPLICABILITY

According to the invention, there can be provided butadiene-based polymers having a cis-1,4 bond content higher than and a vinyl bond content lower than the conventional ones and a molecular weight distribution of a specified range by adopting a specified production method. Also, when the rubber composition is constituted with such a butadiene-based polymer, the wear resistance, resistance to crack growth and resistance to ozone deterioration are considerably improved as compared with the conventional ones, and there can be provided rubber compositions having a good workability. Furthermore, there can be provided tires having excellent wear resistance, resistance to crack growth and resistance to ozone deterioration by using such a rubber composition.

The invention claimed is:

1. A butadiene-based polymer having a 1,3-butadiene monomer unit, characterized in that a cis-1,4 bond content and a vinyl bond content in the 1,3-butadiene monomer unit as measured by a Fourier transform infrared spectroscopy (FT-IR) and calculated according to the following equations (IV) and (VI) are not less than 98.0% and not more than 0.3%, respectively, and a ratio (Mw/Mn) of weight average molecular weight (Mw) to number average molecular weight (Mn) is 1.6-3.5, $$(\text{cis-1,4 bond content}) = e/(e+f+g) \times 100 (\%) \quad \text{(IV)}$$

$$(\text{vinyl bond content}) = g/(e+f+g) \times 100 (\%) \quad \text{(VI)}$$

wherein e, f and g are derived from the following matrix (III):

$$\begin{pmatrix} 1.7455 & 0 & -0.0151 \\ -0.0454 & 0.4292 & -0.0129 \\ -0.007 & 0 & 0.3746 \end{pmatrix} \begin{pmatrix} \log_{10}(a/d) \\ \log_{10}(a/b) \\ \log_{10}(a/c) \end{pmatrix} = \begin{pmatrix} e \\ f \\ g \end{pmatrix} \quad \text{(III)}$$

wherein a represents a mountain peak value near 1130 cm$^{-1}$, b represents a valley peak value near 967 cm$^{-1}$, c represents a valley peak value near 911 cm$^{-1}$ and d represents a valley peak value near 736 cm$^{-1}$ in the FT-IR spectrum.

2. A butadiene-based polymer according to claim 1, wherein the cis-1,4 bond content and the vinyl bond content satisfy a relationship of the following equation (I):

$$(\text{vinyl bond content}) \leq 0.25 \times ((\text{cis-1,4 bond content}) - 97)(\%) \quad \text{(I)}$$

3. A butadiene-based polymer according to claim 1, wherein the ratio (Mw/Mn) of weight average molecular weight (Mw) to number average molecular weight (Mn) is 1.6-2.7.

4. A butadiene-based polymer according to claim 1, wherein the polymer consists of 80-100% by mass of 1,3- butadiene monomer unit and 20-0% by mass of the other monomer unit capable of copolymerizing with 1,3-butadiene.

5. A butadiene-based polymer according to claim 4, wherein the polymer is made of only 1,3-butadiene monomer unit.

6. A butadiene-based polymer according to claim 1, wherein the number average molecular weight (Mn) is 100,000-500,000.

7. A butadiene-based polymer according to claim 6, wherein the number average molecular weight (Mn) is 150,000-300,000.

8. A method of producing a butadiene-based polymer, characterized in that monomers at least containing 1,3-butadiene are polymerized through a solution polymerization at a temperature of lower than 25° C. in the presence of a catalyst system consisting of:

(A) component: a compound containing a rare earth element of Atomic Number 57-71 in the Periodic Table or a reaction product of such a compound with a Lewis base;

(B) component: an organoaluminum compound represented by the following general formula (II):

$$AlR^1R^2R^3 \qquad (II)$$

(wherein $R^1$ and $R^2$ are the same or different and are hydrocarbon group having a carbon number of 1-10 or a hydrogen atom, and $R^3$ is a hydrocarbon group having a carbon number of 1-10 provided that $R^3$ may be the same as or different from $R^1$ or $R^2$) and/or (D) component: an aluminoxane;

(C) component: at least one of Lewis acid, a complex compound of a metal halogen compound and Lewis base and an organic compound containing an active halogen, and a conjugated diene monomer, and the catalyst system is previously prepared in the presence of component (A), component (B) and/or component (D), component (C), and the conjugated diene monomer, wherein the rare earth element containing compound in the component (A) is a branched carboxylate of neodymium soluble in a hydrocarbon solvent or a reaction product of such a salt with a Lewis base soluble in a hydrocarbon solvent.

9. A rubber composition, characterized in that a rubber component contains not less than 10% by mass of a butadiene-based polymer as claimed in claim 1.

10. A rubber composition according to claim 9, wherein less than 10 parts by mass of a filler is compounded based on 100 parts by mass of the rubber component.

11. A rubber composition according to claim 10, wherein the rubber composition is sulfur crosslinkable.

12. A tire, characterized in that a rubber composition as claimed in claim 9 is used in any member of the tire.

* * * * *